United States Patent
Kravtsova et al.

(10) Patent No.: US 8,782,533 B2
(45) Date of Patent: Jul. 15, 2014

(54) COLLABORATIVE DEVICE FOR ENABLING USERS TO SELECT COLLABORATIVE CONTENT, AND METHOD THEREOF

(75) Inventors: Natasha Kravtsova, Eindhoven (NL); Herman Ter Horst, Eindhoven (NL); Warner Rudolph Theophile Ten Kate, Eindhoven (NL); Johannes Henricus Maria Korst, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1587 days.

(21) Appl. No.: 11/996,358

(22) PCT Filed: Jul. 12, 2006

(86) PCT No.: PCT/IB2006/052354
§ 371 (c)(1),
(2), (4) Date: Jan. 22, 2008

(87) PCT Pub. No.: WO2007/010443
PCT Pub. Date: Jan. 25, 2007

(65) Prior Publication Data
US 2008/0215989 A1  Sep. 4, 2008

(30) Foreign Application Priority Data
Jul. 21, 2005 (EP) .................................... 05106676

(51) Int. Cl.
*G06F 3/00* (2006.01)
*G06F 3/0481* (2013.01)
*G06F 3/0482* (2013.01)
*G06F 3/0484* (2013.01)

(52) U.S. Cl.
CPC ............ *G06F 3/0481* (2013.01); *G06F 3/0482* (2013.01); *G06F 3/0484* (2013.01)
USPC .......................................... 715/751; 715/753

(58) Field of Classification Search
CPC .... G06F 3/0481; G06F 3/0482; G06F 3/0484
USPC .................................................. 715/751, 753
See application file for complete search history.

(56) References Cited

U.S. PATENT DOCUMENTS

| 5,884,282 A | * | 3/1999 | Robinson ......................... 705/27 |
| 6,112,186 A | * | 8/2000 | Bergh et al. ..................... 705/10 |

(Continued)

FOREIGN PATENT DOCUMENTS

| GB | 2372682 A | 8/2002 |
| WO | 02080551 A1 | 10/2002 |

(Continued)

OTHER PUBLICATIONS

Mc Carthy et al, "Musicfx: An Arbiter of Group Preferences for Computer Supported Collaborative Workouts", ACM 2000 Conference on Computer Supported Cooperative Work, 2000, pp. 363-372.

(Continued)

*Primary Examiner* — Tuyetlien Tran

(57) ABSTRACT

The invention relates to a method of enabling a first user and a second user to obtain collaborative content. The method comprises steps of obtaining a plurality of content preference data comprising a first content preference data (121) of the first user and a second content preference data (131) of the second user, obtaining dependency data (114, 114a) indicating dependency of the first content preference data on the second content preference data, and using the plurality of content preference data for a selection of the collaborative content under control of the dependency data. The invention also relates to a collaborative device for enabling a first user and a second user to obtain collaborative content.

9 Claims, 1 Drawing Sheet

(56) References Cited

U.S. PATENT DOCUMENTS

| | | | |
|---|---|---|---|
| 6,438,579 B1* | 8/2002 | Hosken | 709/203 |
| 6,697,824 B1* | 2/2004 | Bowman-Amuah | 709/229 |
| 6,865,546 B1* | 3/2005 | Song | 705/26 |
| 6,963,848 B1* | 11/2005 | Brinkerhoff | 705/10 |
| 7,231,419 B1* | 6/2007 | Gheorghe et al. | 709/203 |
| 7,547,841 B2* | 6/2009 | Furuta | 84/609 |
| 2001/0053994 A1* | 12/2001 | Atcheson et al. | 705/10 |
| 2002/0174428 A1* | 11/2002 | Agnihotri et al. | 725/46 |
| 2003/0110056 A1* | 6/2003 | Berghofer et al. | 705/1 |
| 2003/0149612 A1* | 8/2003 | Berghofer et al. | 705/10 |
| 2003/0154180 A1* | 8/2003 | Case et al. | 707/1 |
| 2003/0182315 A1* | 9/2003 | Plastina et al. | 707/200 |
| 2003/0229537 A1* | 12/2003 | Dunning et al. | 705/10 |
| 2003/0236708 A1* | 12/2003 | Marsh | 705/26 |
| 2004/0019497 A1 | 1/2004 | Volk et al. | |
| 2004/0054572 A1* | 3/2004 | Oldale et al. | 705/10 |
| 2004/0098386 A1* | 5/2004 | Thint et al. | 707/3 |
| 2004/0221308 A1* | 11/2004 | Cuttner et al. | 725/46 |
| 2004/0267596 A1* | 12/2004 | Lind et al. | 705/10 |
| 2005/0060350 A1 | 3/2005 | Baum et al. | |
| 2005/0165766 A1* | 7/2005 | Szabo | 707/3 |
| 2006/0020973 A1* | 1/2006 | Hannum et al. | 725/46 |
| 2006/0031288 A1* | 2/2006 | Ter Horst et al. | 709/204 |
| 2006/0195515 A1* | 8/2006 | Beaupre et al. | 709/203 |

FOREIGN PATENT DOCUMENTS

| | | |
|---|---|---|
| WO | 03043333 A1 | 5/2003 |
| WO | 03056825 A1 | 7/2003 |
| WO | 03098932 A1 | 11/2003 |

OTHER PUBLICATIONS

C. Drews et al, "Virtual Jukebox, Reviving a Classic", Proceedings of the 35th HICSS, 2002, pp. 887-893.

* cited by examiner

COLLABORATIVE DEVICE FOR ENABLING USERS TO SELECT COLLABORATIVE CONTENT, AND METHOD THEREOF

The invention relates to a method of enabling a first user and a second user to obtain collaborative content, and a collaborative device for enabling a first user and a second user to obtain collaborative content.

Article "Virtual Jukebox. Reviving a Classic", C. Drews, F. Pestoni, Proceedings of the 35th HICSS 2002, discloses a system for building and using a collective profile to automatically select content. The system allows users to express their preferences by contributing songs to be played and through a voting scheme. The system comprises a distributed storage with music files, a networked music player, and a server for providing the music files to the player. As a song is played, users vote for or against the song. The system collects votes and builds the collective profile representing collective preferences of the users. On the basis of the collective profile, a playlist of songs is adapted or generated.

When the votes of users are contradictory in respect of the played songs, i.e., positive and negative votes are collected by the system, the collective preferences do not allow to exclude or to include the songs in the playlist. In this situation, it is impossible to select the songs on the basis of the collective preferences, and the content selection is not effective.

It is desirable to provide the method that enables a first user and a second user to obtain collaborative content in spite of that the preferences of the users are contradictory.

The method comprises steps of:

obtaining a plurality of content preference data comprising a first content preference data of the first user and a second content preference data of the second user, obtaining dependency data indicating dependency of the first content preference data on the second content preference data, and using the plurality of content preference data for a selection of the collaborative content under control of the dependency data.

The content preference data may be representative of preferences of the users to content, e.g., songs and movies, that has been presented to the users. In one example, the content preferences of the users are derived, e.g., from TV watching habits of the user, or a selection history of TV programs. The content preferences may also be predetermined in a stereotypical user profile. In another example, the users are provided with means to create and edit the content preference data manually.

The dependency data are used when the collaborative content is selected on the basis of the first and second content preference data. For instance, the dependency data indicates a manner in which the first and second content preference data are combined into collaborative content preference data. The process of combining may involve a check whether a particular content item has a positive or negative rating in the first and second content preference data. Further, the dependency data are analysed to determine a next step. For instance, if the dependency data indicates that the positive rating of the particular content item in the second content preference data overrules any rating of the particular content in the first content preference data, the rating of the particular content item only from the second content preference data is used in the collaborative content preference data. The rating in the first content preference data may be ignored in case the rating of the particular content item in the first content preference data is contradictory to the one from the second content preference data. In this way, the conflicting ratings of the users are processed so that a priority is given to one of the ratings. Undoubtedly, the collaborative content preference data comprises now an unequivocal rating for the particular content item, and the content selection may be performed unambiguously.

The dependency data may be specified explicitly by the first user in the first content preference data, e.g., because the first user prefers that the rating from the second user is used. In another example, the dependency data may be derived automatically, e.g., from amount of an experience of the users in rating content items of a particular genre.

The present invention overcomes the drawback of the system known from the article "Virtual Jukebox. Reviving a Classic". In the known system, a combination of the positive and negative ratings results in a useless joint rating that is nil. Such a joint rating in the collaborative content preference data does not indicate whether any of the users likes the particular content item. Thus, the particular content item would not be recommended to the first and second users. In contrast, the present invention allows, for example, one user to give another user a priority for inclusion of the particular content item in the collaborative content. For example, the first content preference data and the second content preference data may include references to each other to influence the selection of the collaborative content.

The collaborative device of the present invention comprises a data processor configured to obtain a plurality of content preference data comprising a first content preference data of the first user and a second content preference data of the second user, obtain dependency data indicating dependency of the first content preference data on the second content preference data, and use the plurality of content preference data for a selection of the collaborative content under control of the dependency data.

The collaborative device ensures that the first and second content preference data are processed using the dependency data so that, e.g., the first content preference data has a certain priority in respect of the second content preference data.

These and other aspects of the invention will be further explained and described, by way of example, with reference to the following drawings.

Figure 1:
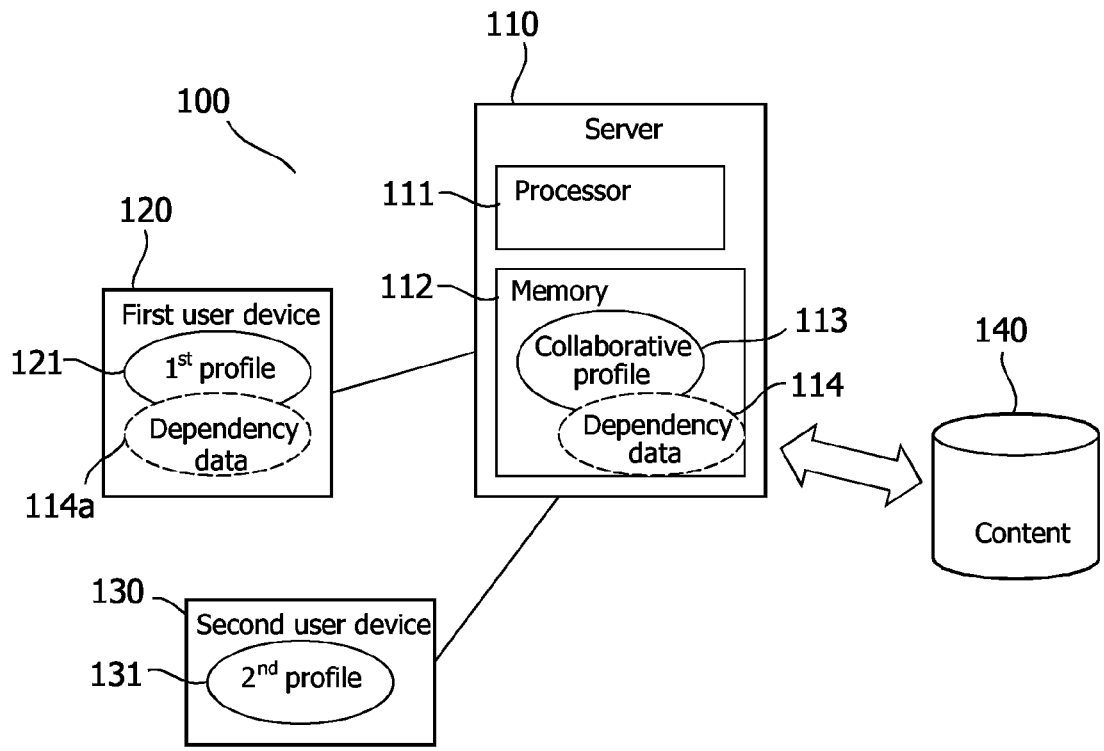
FIG. 1 is a functional block diagram of an embodiment of the device according to the present invention.

The invention may be embodied in a server-client system 100 comprising a server 110 (collaborative device) for communicating with a first user device 120 and a second user device 130, as shown in FIG. 1. In another embodiment, the invention is realised in a distributed system, e.g., a Peer-to-Peer network, comprising a first and second user devices but no separate server as in the server-client system. For example, one of the user devices in the distributed system may be configured as the server.

FIG. 1 shows an embodiment of the present invention, comprising the server 110, the first user device 120, the second user device 130 and a content database 140.

The content database 140 may store media content as one or more content items comprising audio and/or video data. The expression "audio data", or "audio content", is hereinafter used as data pertaining to audio comprising audible tones, silence, speech, music, tranquility, external noise or the like. The audio data may be in formats like the MPEG-1 layer III (mp3) standard (Moving Picture Experts Group), AVI (Audio Video Interleave) format, WMA (Windows Media Audio)

format, etc. The expression "video data", or "video content", is used as data which are visible such as a motion picture, "still pictures", video text etc. The video data may be in formats like GIF (Graphic Interchange Format), JPEG (named after the Joint Photographic Experts Group), MPEG-4, etc. The text information may be in the ASCII (American Standard Code for Information Interchange) format, PDF (Adobe Acrobat Format) format, HTML (HyperText Markup Language) format, for example. The meta-data may be in the XML (Extensible Markup Language) format, MPEG7 format, stored in a SQL database or any other format.

The media content may be stored in the content database 140 on different data carriers such as, an audio or video tape, an optical storage discs, e.g., a CD-ROM disc (Compact Disc Read Only Memory) or a DVD disc (Digital Versatile Disc), floppy and hard-drive disk, etc, in any format, e.g., MPEG (Motion Picture Experts Group), MIDI (Musical Instrument Digital Interface), Shockwave, QuickTime, WAV (Waveform Audio), etc. For example, the content database 140 may comprise a computer hard disk drive, a versatile flash memory card, e.g., a "Memory Stick" device, etc.

In short, the system 100 functions as follows. The first and the second user devices are configured to obtain a collaborative content on the basis of a first content preference data 121 of a first user and a second content preference data 131 of a second user. For example, the first and second content preference data (further referred to as first and second preference data) are used to filter multimedia content stored in the content database 140. The filtering process may be carried by the server 110 or by one of the user devices 120 and 130. As a result, a collaborative content is filtered out of the content database 140. Finally, the collaborative content is transmitted to the first and second user devices.

In the particular embodiment shown in FIG. 1, the server 110 is configured to receive the first and the second content preference data 121 and 131 from the first and second user devices 120 and 130 respectively. The first and second preference data are generated, maintained and stored by the devices 120 and 130. For example, the first and the second user devices 120 and 130 are television sets (or personal computers with TV tuners). The television sets may be adapted to monitor a user interaction by selecting TV channels. Favourite TV channels of the first and second users, e.g. frequently selected or watched TV channels per day or week, are recorded in the first and second preference data 121 and 131 at the first user device 120 and the second user device 130 respectively.

Alternatively, the first and second preference data may be stored at the server 110. For example, the first and second user devices 120 and 130 may transfer (encrypted) information to the server 110 about TV channels selections. The server may analyse the information to generate the first and the second preference data.

The server 110 may comprise a data processor 111 configured to carry out functions envisaged in the concept of the present invention. The data processor 111 may be a known (central) processing unit (CPU) suitably arranged to implement the present invention. The server 110 may additionally comprise a memory unit 112, for example, a known RAM (random access memory) memory module. The data processor 111 may be arranged to read from the memory unit at least one instruction (of a computer program) to enable the functioning of the server.

From the first and second preference data 121 and 131, the data processor 111 may compose collaborative content preference data 113 (further referred to as collaborative preference data). For instance, the first and second preference data may include specific rating values of a TV program genre, e.g. a TV news genre or a TV show genre. The data processor may combine the specific rating values into an average value and store the average value in the collaborative preference data 113. In another example, the data processor may be configured to identify preference overlaps in the first and second preference data to establish the collaborative preference data. Once the collaborative preference data is updated by the first and second preference data, the data processor 111 may store the collaborative preference data in the memory unit 112. Using the collaborative preference data, the data processor 111 may obtain the collaborative content from the content database 140. For instance, the data processor 111 may receive from the content database 140 one or more identifiers, e.g. a title, of TV shows, movies, etc. conforming with the collaborative preference data 113.

There may be other ways to obtain the collaborative content than using the collaborative preference data 113. For example, the data processor 111 may access the content database 140 to retrieve first content in accordance with the first preference data 121 and to retrieve second content using the second preference data 131. Further, the data processor may determine overlapping content in the first and second contents. The overlapping content could be interpreted as the collaborative content which both users would prefer.

According to the present invention, dependency data 114 is used for the selection of the collaborative content. The dependency data 114 indicates dependency of the first preference data 121 on the second preference data 131. For instance, the first preference data comprises a list of genres and corresponding preference values of the first user. Additionally, the first preference data specifies conditions when the preference values are overruled depending on the second preference data. An example of the first preference data is given below in Table.

TABLE

| Genre of content | Preference, max 100 | Overrule Dependency |
|---|---|---|
| TV news | 80 | |
| Movies | 99 | |
| Sport | 70 | |
| TV Shows | 10 | "Peter" > 80 |
| TV education | 50 | |
| Music: Classical | 30 | "Helen" > 75 |
| Music: Jazz | 70 | |

In the example, the first preference data comprises the list of genres, e.g. video genres: TV news, movies, sport, TV shows, TV educational programs; and music genres: classical music, Jazz. Each genre is rated with a value from 0 to 100 depending on a content preference of the first user to the corresponding genre. Such a first preference data with the rated genres may be used in various manners for a content selection. For example, content is selected if the content belongs to a specific genre rated above a predetermined threshold in the first preference data.

The first user may specify for some genres in the first preference data whether ratings of the genres from the second preference data of the second user will be used instead of ratings of the genres from the first preference data. In the example from Table, the genre "TV shows" has a low rating 10 out of 100 points. However, the dependency data in the first preference data indicates that if the second preference data of the second user (identified as) "Peter" indicates that the genre "TV shows" is rated more than 80 points, than the "low"

rating of the genre "TV shows" in the first preference data will be ignored in favour of the "high" rating of the genre in the second preference data, provided the second preference data is used together with the first preference data for filtering content. The first preference data 121 may be stored in the first user device 120 together with the dependency data (one or more conditions) 114a. Thus, if the second user likes the genre "TV shows" a lot, TV programs with that genre may still be included in the collaborative content.

The first and second users may specify their own dependency data independently of each other. The second user device 130 may also store the dependency data (not shown) related to the second preference data 131.

As an alternative to the condition where the genre "TV shows" is rated more than 80 points in the second preference data, another condition in the first preference data may specify that the genre is rated with 80 points if the second preference data indicates that the second user has not watched a TV program with the genre "TV shows" for more than a predetermined time period.

In the example from Table, it may be indicated that the rating of the genre from the second preference data should be instead of the first preference data independent of the value of the rating. For example, an identifier of the second user "Peter" or a simple reference to the second preference data may be indicated in the first preference data with respect to a specific genre. In this way, the first user delegates the selection of the content of the corresponding genre to the second user.

It should be noted that the dependency data as illustrated in Table requires that the first and the second preference data are compatible in a classification of the genres. The compatibility of the first and second preference data may be ensured by entrusting the server 110 to maintain the first and second preference data in the same format.

The dependency data 114 may also be implemented in another way. For example, the data processor 111 is configured to analyse the first and second preference data comprising records with history of consumption of content by the first and second users. The analysis may serve to find out whether the first user or the second user has more experience with watching or listening to content of a specific genre. For example, a selection frequency of the content and the time period of watching or listening to the content may determine a level of the experience. On the basis of the experience level, the data processor may determine whether a rating value from the first or the second preference data will be used in respect the genre. The data processor may request the first or second user to confirm the determination or perform the determination automatically without informing the users.

The dependency data are not restricted to be expressed in terms of the first or second user only. The dependency data may also relate to groups of users. For instance, the first user may specify in the first preference data 121 that the "low" rating of the genre "TV shows" should be ignored if content preference data of any other user of the group (not necessarily the second preference data) indicates a "high" rating for the genre.

The first user device and/or the second user device may be any of various consumer electronics devices such as a television set (TV set) with a cable, satellite or other link, a video-cassette- or HDD-recorder, a home cinema system, a portable CD player, a remote control device such as an iPronto remote control, a cell phone, etc.

Figure 2:
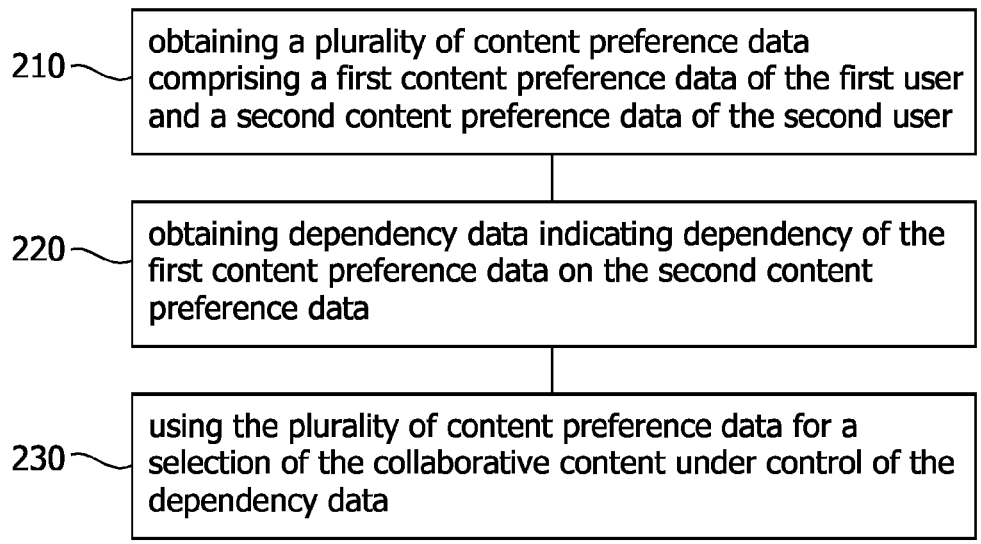
FIG. 2 is an embodiment of the method of the present invention.

FIG. 2 shows an embodiment of the method of the present invention. The method comprises a step 210 of obtaining a plurality of content preference data comprising the first and second content preference data. The content preference data may indicate preferences of the corresponding user in any form suitable for the content selection, for example using RDF (Resource Description Framework) data specifications of the Semantic Web technology (http://www.w3.org). For example, the content preference data may indicate a degree to which the corresponding user likes or dislikes a particular content item, genre or topic (nature, science, etc.). In step 220, the dependency data is obtained that indicates dependency of the first content preference data on the second content preference data. The dependency data may be a part of the first or second preference data stored at the devices 120 or 130 respectively. Alternatively, the dependency data may be stored separately from the content preference data e.g. in the memory unit 112 of the server 110. The dependency data is created by the first or second user, or it is derived by the data processor 111 automatically. The dependency data may be implemented as references between the content preference data using URI (Uniform Resource Identifiers). In step 230, the plurality of content preference data are used for a selection of the collaborative content under control of the dependency data. The dependency data may control a manner of using the first and second preference data for the selection. For instance, the first or second preference data can be ignored in favour of each other, or substituted with each other as explained above.

Variations and modifications of the described embodiment are possible within the scope of the inventive concept. For example, in one embodiment, the system according to the present invention is implemented in a single collaborative device, instead of the server-client architecture shown in FIG. 1. The content database 140 may be separate from or incorporated into the server 110.

The data processor may execute a software program to enable the execution of the steps of the method of the present invention. The software may enable the device of the present invention independently of where it is being run. To enable the device, the processor may transmit the software program to the other (external) devices, for example. The independent method claim and the computer program product claim may be used to protect the invention when the software is manufactured or exploited for running on the consumer electronics products. The external device may be connected to the processor using existing technologies, such as Blue-tooth, IEEE 802.11 [a-g], etc. The processor may interact with the external device in accordance with the UPnP (Universal Plug and Play) standard.

A "computer program" is to be understood to mean any software product stored on a computer-readable medium, such as a floppy disk, downloadable via a network, such as the Internet, or marketable in any other manner. The various program products may implement the functions of the system and method of the present invention and may be combined in several ways with the hardware or located in different devices. The invention can be implemented by means of hardware comprising several distinct elements, and by means of a suitably programmed computer.

The invention claimed is:

1. A method of enabling a first user and a second user to obtain collaborative content from a content database, comprising:

obtaining a plurality of content preference data that comprises a first content preference data of the first user and a second content preference data of the second user, the first and second content preference data each respectively including (i) list of genres and (ii) rating values corresponding to respective genres, the rating values including a value from 0 to 100, and wherein a collaborative content is selected if the content belongs to a specific genre rated above a predetermined threshold in the corresponding first or second content preference data;

obtaining dependency data indicating dependency of (i) a rating value for a given genre in the first content preference data on (ii) a rating value for a corresponding genre in the second content preference data; and using the plurality of content preference data for a selection of the collaborative content from the content database under control of the dependency data, wherein the dependency data controls a manner of using the first and second content preference data for the selection, wherein dependency data of the first content preference data specifies conditions when the rating values of the first content preference data are overruled depending on the second content preference data, further wherein one of the first or second content preference data is (i) ignored in favor of the other or (ii) substituted with the other.

2. The method of claim 1, wherein the first content preference data of the first user comprises an identifier of the second user.

3. The method of claim 1, wherein the dependency data indicates that the second content preference data has a higher priority value for the selection than the first content preference data.

4. The method of claim 1, wherein the second content preference data comprises content consumption history data of the second user.

5. The method of claim 1, wherein the first content preference data and the second content preference data are combined into collaborative content preference data for the selection of the collaborative content.

6. A collaborative device for enabling a first user and a second user to obtain collaborative content from a content database, the device comprising a data processor configured to obtain a plurality of content preference data that comprises a first content preference data of the first user and a second content preference data of the second user, the first and second content preference data each respectively including (i) list of genres and (ii) rating values corresponding to respective genres, the rating values including a value from 0 to 100, and wherein a collaborative content is selected if the content belongs to a specific genre rated above a redetermined threshold in the corresponding first or second content preference data, obtain dependency data indicating dependency of (i) rating value for a given genre in the first content preference data on (ii) rating value for a corresponding genre in the second content preference data, and use the plurality of content preference data for a selection of the collaborative content from the content database under control of the dependency data, wherein the dependency data controls a manner of using the first and second content preference data for the selection, wherein dependency data of the first content preference data specifies conditions when the rating values of the first content preference data are overruled depending on the second content preference data, further wherein one of the first or second content preference data is (i) ignored in favor of the other or (ii) substituted with the other.

7. The device of claim 6, wherein the dependency data is obtained from a first user device of the first user, the first user device having stored the dependency data.

8. The device of claim 6, wherein the collaborative content is transmitted to a first user device of the first user and to a second user device of the second user.

9. A non-transitory computer-readable medium embodied with a computer program including instructions adapted to implement, when executed on a computing device, the steps of the method as claimed in claim 1.

* * * * *